UNITED STATES PATENT OFFICE.

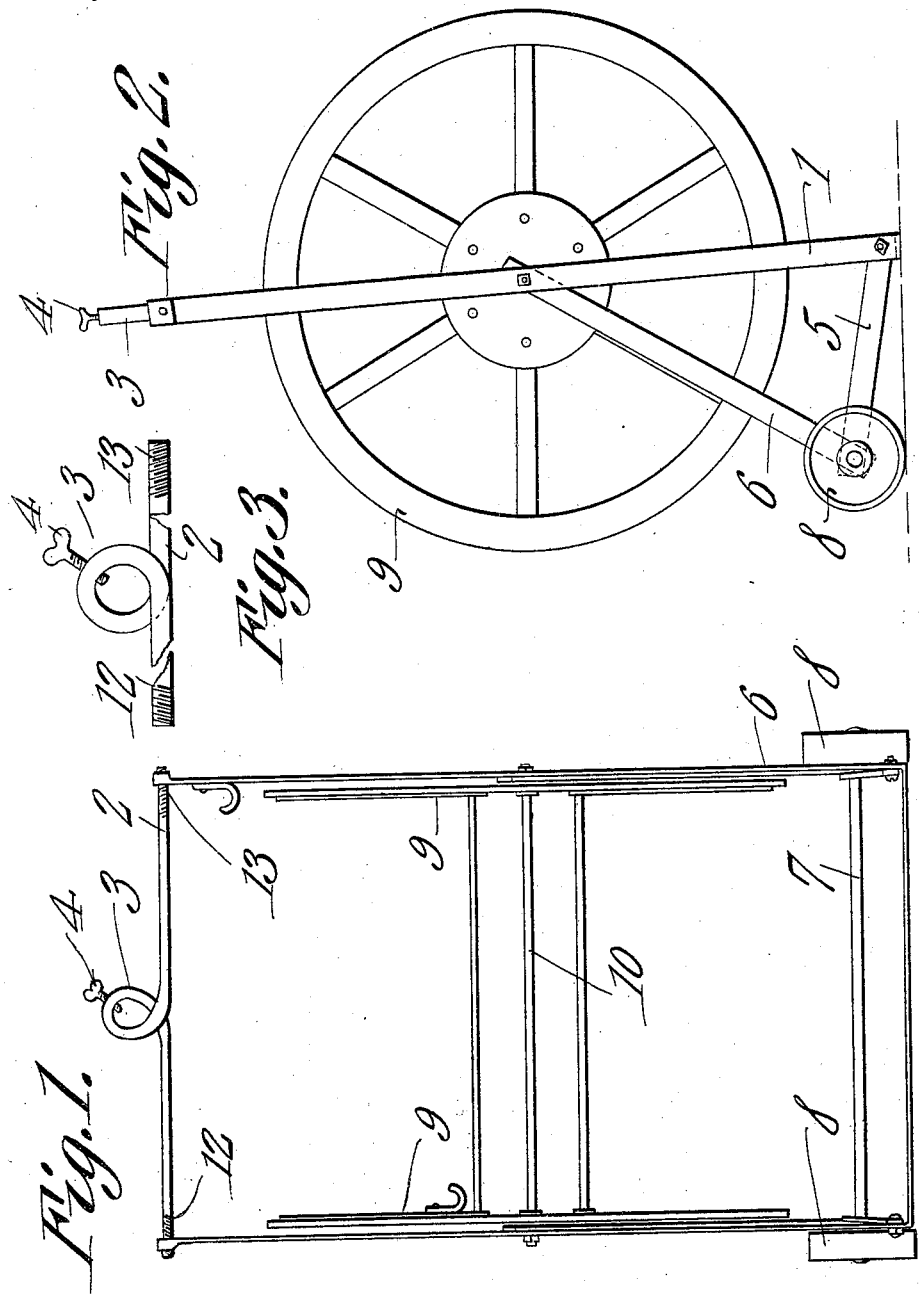

LOUIS A. TROPE, OF LAWTON, OKLAHOMA.

HOSE-HOLDER.

966,625. Specification of Letters Patent. Patented Aug. 9, 1910.

Application filed December 10, 1909. Serial No. 532,404.

*To all whom it may concern:*

Be it known that I, LOUIS A. TROPE, a citizen of the United States, residing at Lawton, in the county of Comanche and State of Oklahoma, have invented a new and useful Hose-Holder, of which the following is a specification.

This invention relates to improvements in hose holders and consists in a certain novel construction which is illustrated in the accompanying drawings and will be hereinafter first fully described and then particularly pointed out in the appended claims.

In the drawings,—Figure 1 is a front elevation of a hose reel equipped with my invention. Fig. 2 is a side elevation of the same, and Fig. 3 is a detail view partly broken away.

In carrying out my invention, I may employ a U-shaped frame 1 of metal, the upper ends of which are connected by a cross bar 2 having an eye 3 formed at its center and a thumb screw 4 mounted in the said eye so as to extend into the bore of the same. The cross bar is provided at its opposite ends with right and left handed threads as indicated at 12 and 13 whereby when the bar is rotated the sides of the frame will be drawn toward each other and the rod consequently firmly held. To the side of the frame 1, at the lower end thereof, I secure the rearwardly extending arms 5 between the rear ends of which and the side arms of the frame 1 braces 6 are disposed, the upper ends of the braces being secured to the said sides of the main frame, as will be readily understood. An axle 7 is secured in and extends between the rear ends of the arms 5 and casters 8 are mounted on the ends of the said axle so as to facilitate the moving of the reel from place to place. Between the sides of the frame 1 an ordinary hose reel 9 is mounted, the said reel being provided with an axle 10 which is journaled in the said side bars and the upper ends of the braces 6 so as to turn freely, as will be readily understood.

The use of the device will be readily appreciated. A garden hose is wound upon the reel 9 in the usual manner so as to be easily stored and when it is desired to use the hose so as to sprinkle a lawn or for any other purpose the nozzle is inserted through the eye 3 and secured therein by turning home the set screw 4, as will be readily understood. The hose may be unwound from the reel and attached to the water pipe in the usual manner and the reel then left in position to direct the stream of water issuing from the nozzle to any desired point of the lawn. The lawn will, consequently, be watered without requiring the constant attendance of the user of the hose.

The device is exceedingly simple in its construction and can be manufactured at a slight cost while it may be easily moved from point to point so as to direct the water to any desired part of the lawn or move the hose into the house after the lawn has been sufficiently watered.

It is to be understood that while the hose reel is a convenient application of the invention, the casters 8 and the reel 9 may be omitted and the frame utilized as a stand only. The nozzle-supporting cross bar will serve as a handle by which the stand may be carried from point to point and the rotation of the cross bar will quickly secure it in the opposite sides of the frame owing to the threaded formation of the ends.

Having thus described my invention, what I claim is:

1. In combination with a supporting frame having side bars or elements, a continuous cross bar terminally attached to the side bars or elements and having an intermediate loop or ring, said cross bar being revoluble relative to the frame to vary the size of the loop.

2. A hose holder comprising a U-shaped frame, a cross bar connecting the upper ends of the said frame and provided at its center with an eye, a thumb screw mounted in the said eye, rearwardly extending arms secured to the sides of the frame at the lower end thereof, and braces extending between the sides of the frame and the rear ends of said arms.

3. In combination with a supporting frame having relative fixed side bars or elements, a continuous cross bar terminally mounted in the side bars or elements, and provided with an intermediate loop or ring offset from the axis of the cross bar, said cross bar being revoluble relative to the side bars for varying the size of the loop.

4. A hose holder having a contractible loop provided with terminals arranged in approximate alinement and respectively right and left threaded in combination with a support with which said threaded terminals are engaged for axial adjustment to vary the diameter of the loop.

5. In combination with a frame having side bars or elements, a continuous cross bar mounted for rotation within the said bars or elements and having an intermediate continuous off-set loop, and coöperating means upon one of said elements and the cross bar for shifting the cross bar to vary the diameter of the loop during the rotation of the cross bar.

In testimony that I claim the foregoing as my own, I have hereto affixed my signature in the presence of two witnesses.

LOUIS A. TROPE.

Witnesses:
 ABE B. MARCH,
 ARCH M. MARCH.